United States Patent [19]
Arlt et al.

[11] Patent Number: 5,366,324
[45] Date of Patent: Nov. 22, 1994

[54] RISER TENSIONER SYSTEM FOR USE ON OFFSHORE PLATFORMS USING ELASTOMERIC PADS OR HELICAL METAL COMPRESSION SPRINGS

[75] Inventors: Edward J. Arlt, Ft. Worth; Charles J. Moses, Alvarado, both of Tex.

[73] Assignee: LTV Energy Products Co., Del.

[21] Appl. No.: 902,391

[22] Filed: Jun. 18, 1992

Related U.S. Application Data

[63] Continuation of Ser. No. 628,439, Dec. 13, 1990, abandoned.

[51] Int. Cl.$^5$ ............................................. E02B 17/00
[52] U.S. Cl. ................................. 405/195.1; 405/203; 405/224; 166/367
[58] Field of Search ................... 267/141.1, 153, 257, 267/258, 294, 166, 168, 249, 250; 405/195.1, 203, 204, 224; 166/350, 359, 367; 175/7

[56] References Cited

U.S. PATENT DOCUMENTS

| Re. 30,262 | 4/1980 | Schmidt . | |
|---|---|---|---|
| 2,553,636 | 5/1951 | Dath . | |
| 2,559,743 | 7/1951 | Williams . | |
| 2,598,762 | 6/1952 | Dath . | |
| 2,702,703 | 2/1955 | Franceschetti | 267/141.1 |
| 2,724,588 | 11/1955 | Sheets | 267/294 X |
| 2,836,413 | 5/1958 | Hirst . | |
| 3,434,708 | 3/1969 | Hawk | 267/153 X |
| 3,480,268 | 11/1969 | Fishbaugh . | |
| 3,489,402 | 1/1970 | Cobley . | |
| 3,537,696 | 11/1970 | Webster, Jr. . | |
| 3,547,426 | 12/1970 | Hart et al. . | |
| 3,556,554 | 1/1971 | Seward . | |
| 3,575,403 | 4/1971 | Hamel . | |
| 3,606,295 | 9/1971 | Appleton . | |
| 3,677,535 | 7/1972 | Beck . | |
| 3,830,483 | 8/1974 | Gaydecki . | |
| 3,831,922 | 8/1974 | Appleton . | |
| 3,997,151 | 12/1976 | Leingang . | |
| 4,105,266 | 8/1978 | Finney . | |
| 4,140,304 | 2/1979 | Ghrist . | |
| 4,198,037 | 4/1980 | Anderson . | |
| 4,379,657 | 4/1983 | Widiner et al. | 405/195 |
| 4,449,854 | 5/1984 | Nayler | 405/195 |
| 4,489,962 | 12/1984 | Caumont et al. | 285/263 |
| 4,617,998 | 10/1986 | Langner | 166/345 |
| 4,756,512 | 7/1988 | Toms, Jr. | 267/70 |
| 4,883,387 | 11/1989 | Myers et al. | 405/195 |
| 4,892,444 | 1/1990 | Moore | 405/195 |
| 4,968,010 | 11/1990 | Odobasic | 267/294 X |
| 4,997,171 | 3/1991 | Toms | 267/294 |

FOREIGN PATENT DOCUMENTS

| 1001122 | 2/1952 | France | 267/258 |
|---|---|---|---|
| 130490 | 1/1951 | Sweden | 267/141.1 |

Primary Examiner—Randolph A. Reese
Assistant Examiner—John Ricci
Attorney, Agent, or Firm—Arnold, White & Durkee

[57] ABSTRACT

A riser tensioner system 10 is provided for use on offshore oil drilling platforms to support a riser 12 relative to a floating platform. The riser tensioner system 10 uses either elastomeric pads 32 or helical metal springs 100 as an energy absorbing medium, rather than hydraulic, or pneumatic systems. The elastomeric pads 32 or helical metal springs 100 are maintained in compression within a shock absorber housing 76 by a plunger 70 which is compressed by the weight of the riser 12. If the riser tensioner system 10 is arranged to place the shock absorber 20 in tension, the shock absorber plunger 70 is inverted in the housing 76 to maintain the elastomeric pads 32 or helical metal springs 100 in compression. To achieve varied response characteristics, nested inner and outer elastomeric pads 50, 52 or compression springs 102, 106 are arranged to act together. A varied response characteristic may also be obtained by varying the elastomeric pad modulus or the helical spring constant, or by use of conically shaped elastomeric pads 80.

18 Claims, 6 Drawing Sheets

RISER TENSIONER SYSTEM FOR USE ON OFFSHORE PLATFORMS USING ELASTOMERIC PADS OR HELICAL METAL COMPRESSION SPRINGS

This is a continuation of copending application Ser. No. 07/628,439 filed on Dec. 13, 1990, now abandoned.

BACKGROUND OF THE INVENTION

1. Field of the Invention

This invention relates generally to riser tensioner systems for use on offshore platforms and, more particularly, to a riser tensioner system that utilizes a compression spring to absorb oscillatory, vertical movement of the platform while supporting the riser.

2. Description of the Related Art

Increased oil consumption has led to exploration and drilling in difficult geographic locations that were previously considered to be economically unfeasible. As is to be expected, drilling under these difficult conditions leads to problems that are not present under more ideal conditions. For example, an increasing number of exploratory wells are being drilled in deep water, offshore locations in an attempt to locate more oil and gas reservoirs. These exploratory wells are generally drilled from floating platforms, leading to a set of problems peculiar to that environment.

As in any drilling operation, offshore drilling requires that drilling fluid must be circulated through the drill bit to cool the bit and to carry away the cuttings. This drilling fluid is normally delivered to the drill bit through the drill string and returned to the floating vessel through an annulus formed between the drill string and a large diameter pipe, commonly known as a riser. The riser typically extends between a subsea wellhead assembly and the floating vessel and is sealed against water intrusion.

The lower end of this riser is connected to the wellhead assembly adjacent the ocean floor, and the upper end usually extends through a centrally located opening in the hull of the floating vessel. The drill string extends longitudinally through the riser and into earth formations lying below the body of water, and drilling fluid circulates downwardly through the drill string, out through the drill bit, and then upwardly through the annular space between the drill string and the riser, returning to the vessel.

As these drilling operations progress into deeper waters, the length of the riser and, consequently, its unsupported weight also increases. Riser structural failure may result if compressive stresses in the elements of the riser exceed the metallurgical limitations of the riser material. Riser tensioner systems are typically used to avoid of this type of riser failure.

Riser tensioner systems are installed onboard the platform, and apply an upward force to the upper end of the riser, usually by means of cable, sheave, and pneumatic cylinder mechanisms connected between the vessel and the upper end of the riser.

In addition, buoyancy or ballasting elements may also be attached to the submerged portion of the riser. These usually are comprised of syntactic foam elements or individual ballast or buoyancy tanks formed on the outer surface of the riser sections. The ballast or buoyancy tanks are capable of being selectively inflated with air or ballasted with water by using the floating vessel's air compression equipment. These buoyancy devices create upwardly directed forces in the riser, and, thereby, compensate for the compressive stresses created by the riser's weight.

Both types of these mechanisms suffer from inherent disadvantages. Hydraulic and pneumatic tensioning systems are large, heavy, and require extensive support equipment, such as, air compressors, hydraulic fluid, reservoirs, piping, valves, pumps, accumulators, electrical power, and control systems. The complexity of these systems necessitate extensive and frequent maintenance with their attendant high cost.

The present invention is directed to overcoming or minimizing one or more of the problems set forth above.

SUMMARY OF THE INVENTION

In one aspect of the present invention, a riser tensioner system is adapted for mounting between a floating platform and a riser, and for applying a generally upward force to the riser while allowing limited vertical movement therebetween. A housing has a central opening extending therein and is adapted for coupling to the floating platform. A plunger assembly is adapted for telescopic movement within the central opening of the housing and includes a rod and plate. The rod has first and second end portions, with the first end portion being adapted for being coupled to the riser. The plate is coupled to the second end portion of the rod and positioned within the housing central opening. A spring is located in the housing and adapted for being compressed between the plate and the housing by movement of the plunger assembly in a first direction. The spring is positioned about the rod and contacts the plate so that movement of the plunger assembly in the first direction within the housing is resisted by compression of the spring.

In another aspect of the present invention, a riser tensioner system is adapted for use in an offshore drilling platform to support a riser while allowing limited vertical movement therebetween. A strut has a first and second end portion and an intermediate portion. The first end portion is adapted for being coupled to said offshore drilling platform, and said second end portion is adapted for being connected to said riser. A first shock absorber has a rod and plate assembly telescoping into and out of a housing adapted for being coupled to said offshore drilling platform. The rod is coupled at a first end portion to said plate and at a second end portion to the intermediate portion of said strut. A spring is positioned in said housing between said housing and said plate, whereby movement of said riser and strut in a first direction is resisted by said spring being compressed between said plate and housing.

In still another aspect of the present invention, a method is provided for using a shock absorber and strut to support a riser on an offshore drilling platform, while allowing limited vertical movement therebetween. The method includes the steps of: rotatably coupling a first end portion of the strut to said riser and a second end portion of the strut to said offshore drilling platform; rotatably coupling said shock absorber at a first end portion to said strut and at a second end portion to said drilling platform; and positioning a spring within said shock absorber so that movement of said riser and strut in a first direction is resisted by compression of said spring within said shock absorber.

BRIEF DESCRIPTION OF THE DRAWINGS

Other objects and advantages of the invention will become apparent upon reading the following detailed description and upon reference to the drawings in which.

While the system is susceptible to various modifications and alternative forms, specific embodiments thereof have been shown by way of example in the drawings and will herein be described in detail. It should be understood, however, that this specification is not intended to limit the invention to the particular forms disclosed herein, but on the contrary, the intention is to cover all modifications, equivalents, and alternatives falling within the spirit and scope of the invention, as defined by the appended claims.

DESCRIPTION OF THE PREFERRED EMBODIMENTS

Figure 1:
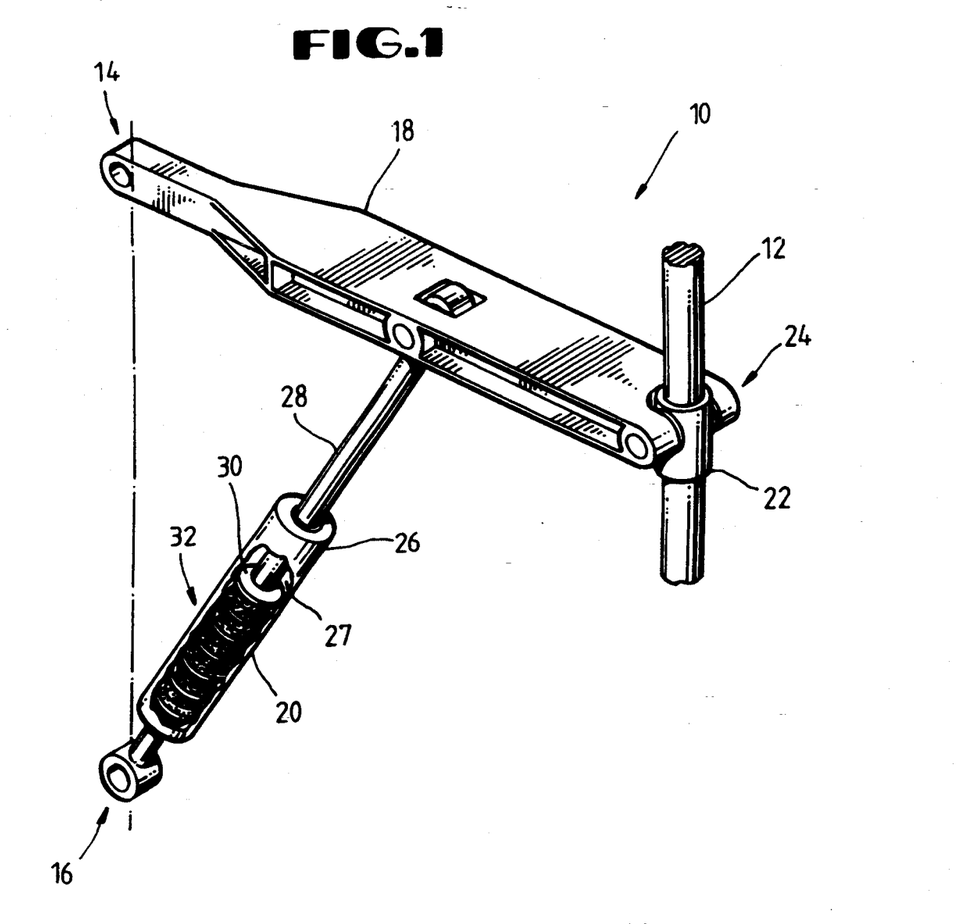
FIG. 1 illustrates a partially cut-away perspective view of one embodiment of a compression mode riser tensioner system.

Referring now to the drawings and, in particular, to FIG. 1, a perspective view of a riser tensioner system 10 is illustrated. The riser tensioner system 10 is connected to a riser 12 that extends from a subsea wellhead (not shown) to a floating platform (not shown). As is to be expected, the floating platform oscillates relative to the riser 12 in accordance with wave action. The riser tensioner system 10 compensates for this oscillatory movement of the floating platform while supporting the riser 12 and preventing it from collapsing under its own weight.

The riser tensioner system 10 is mounted to the floating platform (not shown) via a pair of spaced-apart, pin-type connections 14, 16 located within a first end portion of a strut 18 and shock absorber 20, respectively. The strut 18 also has a second end portion pivotally coupled to the riser 12 via a sleeve 22 and pin-type connection 24. The shock absorber 20 is positioned below the strut 18 and has a second end portion connected to an intermediate portion of the strut 18 to support the strut 18 and riser 12. In this manner, the riser tensioner system 10 supports the riser 12 and prevents it from collapsing under its own weight, while still allowing limited vertical movement of the riser 12 relative to the floating platform.

The shock absorber 20 is formed from a generally cylindrical housing 26 having a central passage 27 extending longitudinally therethrough and opening adjacent the shock absorber second end portion. A rod 28 forms the shock absorber second end portion and extends longitudinally into the housing central passage 27, but is capable of limited telescopic movement therewith.

A plate 30 is connected to and movable with the rod 28, but is captured within the central passage 27. A plurality of elastomeric pads 32 are positioned in contact with one another and are longitudinally disposed in the central passage 27 between the plate 30 and the first end portion of the shock absorber 20. Thus, downward relative movement of the riser 12 urges the strut 18 to pivot about the pin-type connection 14 and force the rod 28 and plate 30 downward, toward the first end portion of the shock absorber 20, compressing the elastomeric pads 32. The combined spring rate of the elastomeric pads 32 effectively resists downward relative movement of the riser 12.

A riser tensioner system 10 of the type illustrated in FIG. 1 is herein referred to as a compression mode riser tensioner system because the shock absorber 20, as a whole, is compressed by downward movement of the riser 12. As is more fully described below, a second embodiment of the riser tensioner system 10 is illustrated in which the shock absorber 20, as a whole, is placed in tension by downward movement of the riser 12, and, therefore, is referred to as a tension mode riser tensioner system.

The riser tensioner system 10 of the present invention places the elastomeric pads 32 in compression instead of shear. Placing the elastomeric pads 32 in compression offers the advantage of a longer fatigue life and a more acceptable failure mode.

Figure 1A:
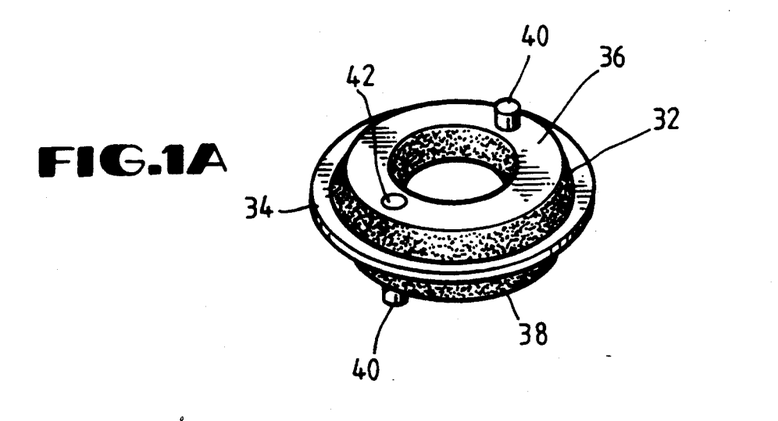
FIG. 1A illustrates a perspective view of a single elastomeric element used in the riser tensioner system of FIG. 1.

FIG. 1A illustrates a perspective of one of the elastomeric pads 32. The pad 32 includes a metallic disc 34 positioned between and bonded to matching elastomeric discs 36, 38. The elastomeric discs 36, 38 are located on opposites sides of the metallic disk 34, and, when positioned in the housing 26, contact similar elastomeric disks 36, 38 on adjacent elastomeric pads 32.

A pair of guide pins 40 and corresponding openings 42 are formed on the elastomeric disks 36, 38 to prevent rotation of the elastomeric pads 32 relative to one another. The guide pins 40 can take the form of elastomer material bonded to or formed with the elastomeric disks 36, 38, or, alternatively, may be formed by an extension of the metallic disk 34.

Deflections of the elastomeric pads 32 in compression allows the riser 12 to stroke, or change the amount of compression, while maintaining tension on the riser 12. The spring rate of the shock absorber 20 is determined by the number of elastomeric pads 32 in the stack. The spring rate may also be manipulated by varying the modulus of the elastomer as well as the shape of the elastomeric material.

A further means of achieving a desired response curve is to use varying moduli of rubber throughout the stack of elastomeric pads. Varying the moduli through the stack of the elastomeric pads will activate more springs as the load increases and will allow softening of the curve where needed. Changing the modulus is designed to enhance the input-output response ratio so as to flatten the load vs. deflection curve of the shock absorber 20. The ideal curve is a constant load over a large deflection range so as to minimize the oscillatory stresses in the riser tensioner apparatus.

Figure 2:
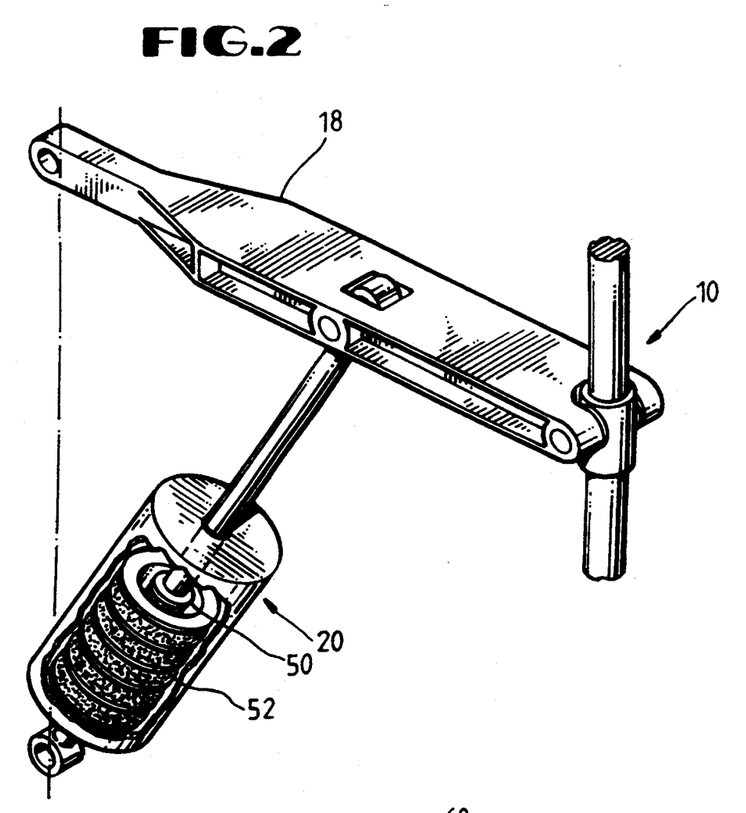
FIG. 2 illustrates a partially cut-away, perspective view of a second embodiment of a compression mode riser tensioner system with nested elastomeric pads.

FIG. 2 shows another embodiment of the compression mode riser tensioner system 10 with nested elastomeric pads 32. The nested elastomeric pads 32 have inner elastomeric pads 50 and outer elastomeric pads 52. The nested arrangement of elastomeric pads 32 is another way of varying the response curve and allowing greater stroke and response range of the shock absorber 20.

Figure 2A:
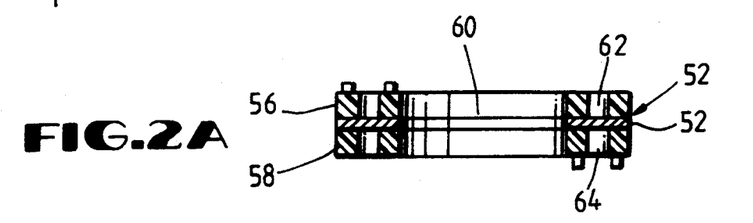
FIG. 2A illustrates a cross sectional side view of one embodiment of a pair of elastomeric pads used in the riser tensioner system of FIG. 2.
Figure 2B:
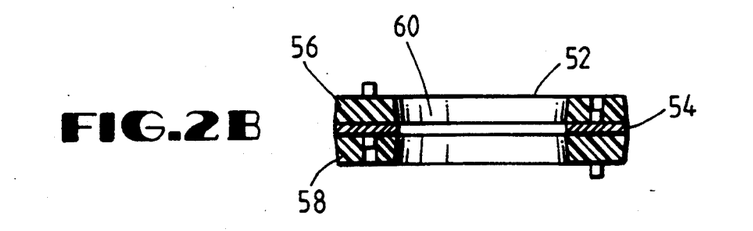
FIG. 2B illustrates a cross sectional side view of another embodiment of a pair of elastomeric pads used in the riser tensioner system of FIG. 2.

FIGS. 2A and B illustrate first and second embodiments of the outer elastomeric pads 52. In the first embodiment shown in FIG. 2A, the outer elastomeric pad 52 includes a metallic disk 54 with a pair of elastomeric disks 56, 58 bonded on opposite sides thereof. The elastomeric disks 56, 58 and the metallic disk 60 have a relatively large central opening 60 to accept the inner elastomeric disks 50 therein. Further, to vary the response characteristics of the shock absorber 20, the elastomeric disks 56, 58 are formed with an annular void 62 extending therethrough.

The second embodiment illustrated in FIG. 2B is substantially similar to the first embodiment, differing slightly in the shape of the elastomeric disks 56, 58 and having no voids formed therein. These differences in the configuration of the elastomeric disks 56, 58 are used to vary the response characteristics of the shock absorber 20.

Figure 3:
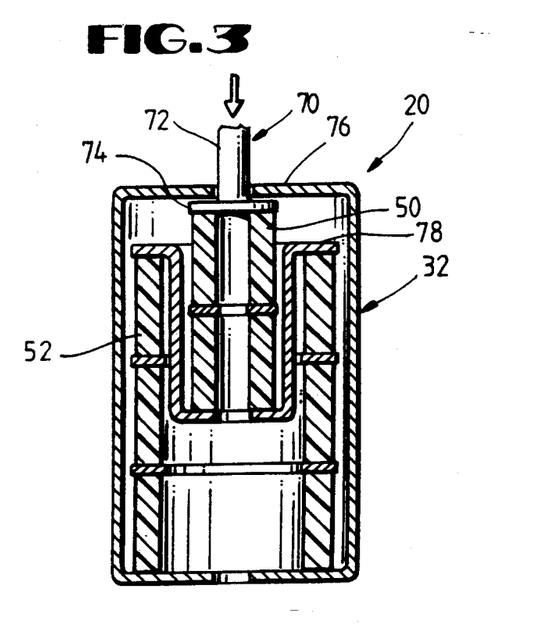
FIG. 3 shows a cross sectional side view of another embodiment of a compression mode riser tensioner system that uses a nested arrangement of elastomeric pads.

FIG. 3 shows a cross sectional side view of the nested shock absorber 20 shown in FIG. 2. A nested pad plunger 70 is constructed from a rod 72 and plate 74 which telescopes into and out of a nested pad housing 76. The nested pad plunger 70 applies pressure directly to the inner elastomeric pads 50. The inner elastomeric pads 50 transfer force from the nested pad plunger 70 to an inner and outer elastomeric pad separator 78. The inner and outer elastomeric pad separator 78 transfers force to the outer elastomeric pads 52 which rest against the nested pad housing 76.

Figure 4:
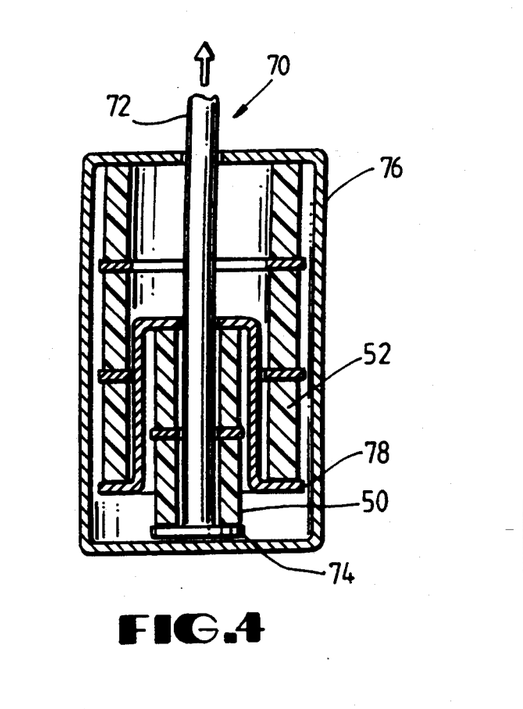
FIG. 4 shows a cross sectional side view of an embodiment of a tension mode riser tensioner system that uses a nested arrangement of elastomeric pads.

FIG. 4 shows a cross sectional side view of a second embodiment of a nested shock absorber 20 arranged as a tension mode shock absorber 20. The shock absorber 20 of FIG. 4, although used in tension mode, advantageously maintains the inner elastomeric pads 50 and outer elastomeric pads 52 in compression. The shock absorber 20 is formed by inverting the nested pad plunger 70 in the nested pad housing 76. By pulling on the rod 72 of the inverted nested pad plunger 70, the same forces are applied to the remaining components of the shock absorber 20, as in FIG. 3.

Figure 5:
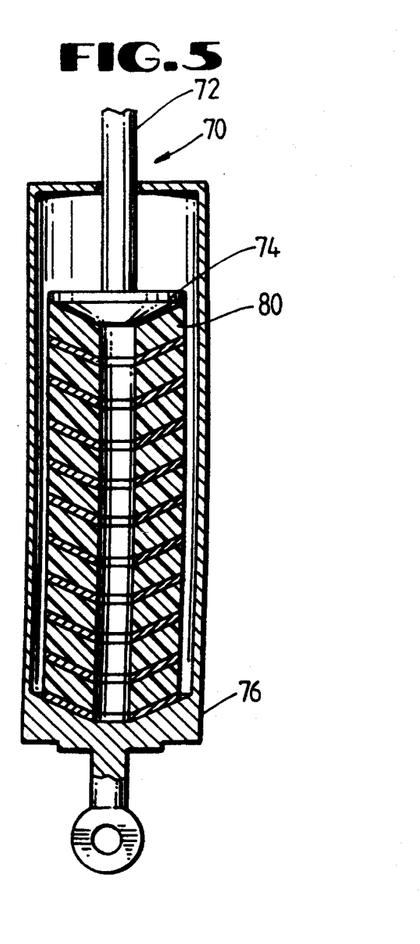
FIG. 5 illustrates a cross sectional side view of another embodiment of a compression mode riser tensioner system using conical elastomeric pads.

FIG. 5 shows another embodiment of a compression mode riser tensioner system 10, using conical elastomeric pads 80. The conical elastomeric pads 80 deform in both the shear and compression directions, however, the compression spring rate dominates at most angles. The conical configuration offers the reliability of compression with a softer spring rate due to partial shearing deflection. The conical configuration also has a greater column alignment stability than a flat elastomeric pad. The conical pad plunger 70 is formed from the rod 72 and plate 74, with the plate 74 being formed to mate with the conical surface of the conical elastomeric pads 80. The conical pad housing 76 is also formed to mate with the conical surface of the conical elastomeric pads 80.

Figure 5A:
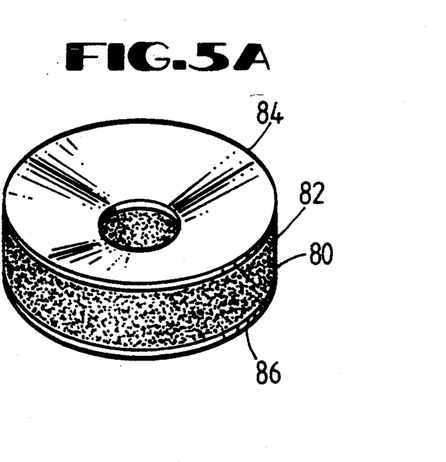
FIG. 5A illustrates a perspective view of a single elastomeric pad used in the riser tensioner system of FIG. 5.

FIG. 5A illustrates a perspective view of one embodiment of the conical elastomeric pads 80. The conical pad 80 includes an elastomeric cone 82 sandwiched between and bonded to matching conical metallic disks 84, 86.

Figure 6:
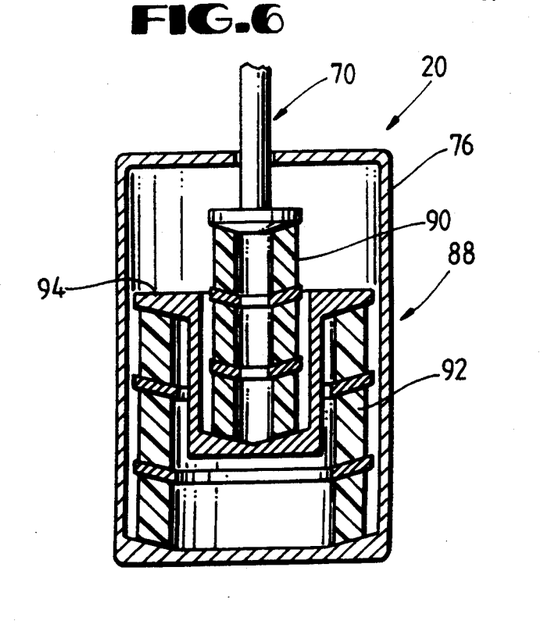
FIG. 6 illustrates a cross sectional side view of another embodiment of a compression mode riser tensioner system using conical elastomeric pads in a nested configuration.

FIG. 6 shows another embodiment of a shock absorber 20 which uses conical elastomeric pads 88 in a nested configuration. The shock absorber 20 consists of the conical nested pad plunger 70, which telescopes into and out of conical nested pad housing 76, inner conical pads 90, outer conical pads 92, and an inner and outer conical pad separator 94. Operation of this embodiment advantageously combines the effects of the embodiments illustrated in FIGS. 4 and 5.

Figure 7:
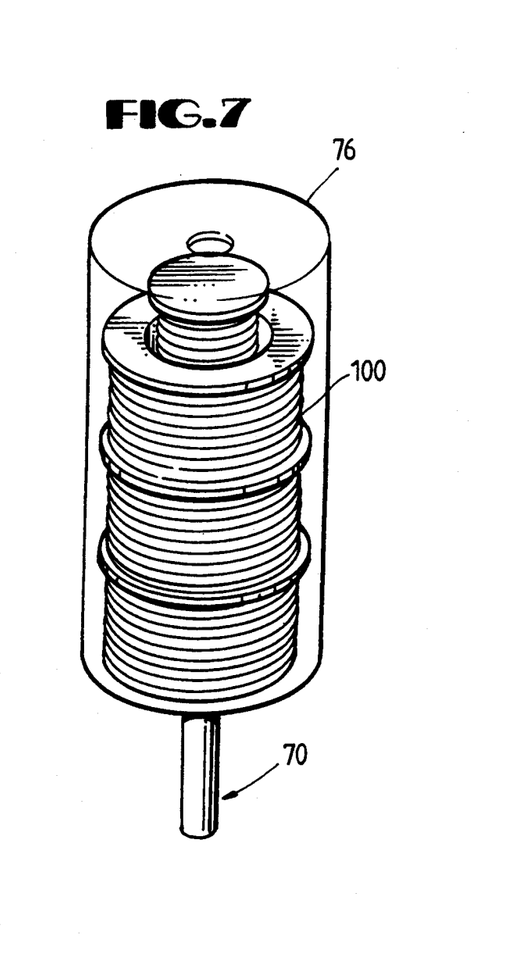
FIG. 7 illustrates a partially cut-away, perspective view of a riser tensioner system using nested stacks of compression type helical springs.

FIG. 7 shows a tension mode shock absorber 20 using nested stacks of compression type helical springs 100 arranged in a series array as a substitute for the elastomeric pads of the previous embodiments. Operation of this helical spring embodiment is substantially similar to the previously elastomeric spring embodiments, but advantageously applies the highly developed and well understood field of metal spring technology.

Figure 8:
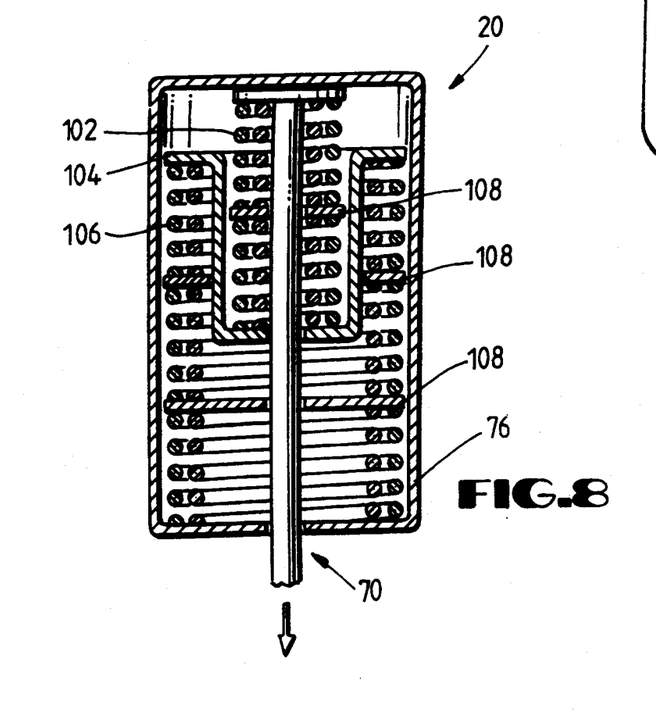
FIG. 8 illustrates a cross sectional side view of the riser tensioner system of FIG. 7 arranged to operate in the tension mode.

FIG. 8 is a cross sectional view of FIG. 7, showing the tension mode nested spring shock absorber 20, with the springs 100 placed in compression, much like the elastomeric shock absorber of FIG. 4. Operating the spring in compression offers enhanced fatigue life and fail-safe operation just as with an elastomeric material shown in FIG. 4.

The nested spring shock absorber 20 of FIGS. 7 and 8 consists of the nested compression spring plunger 70 telescoping into and out of the nested compression spring housing 76. The nested compression spring plunger 70 compresses inner compression springs 102 which transfer force to the inner and outer nested compression spring separator 104. The inner and outer nested compression separator 104 transfers force to the outer compression springs 106, which are supported by the nested compression spring housing 76. Intermediate separator plates 108 separate the stacks of inner compression springs 102 and outer compression springs 106.

The intermediate stabilizer plates 108 reduce column instability.

Figure 9:
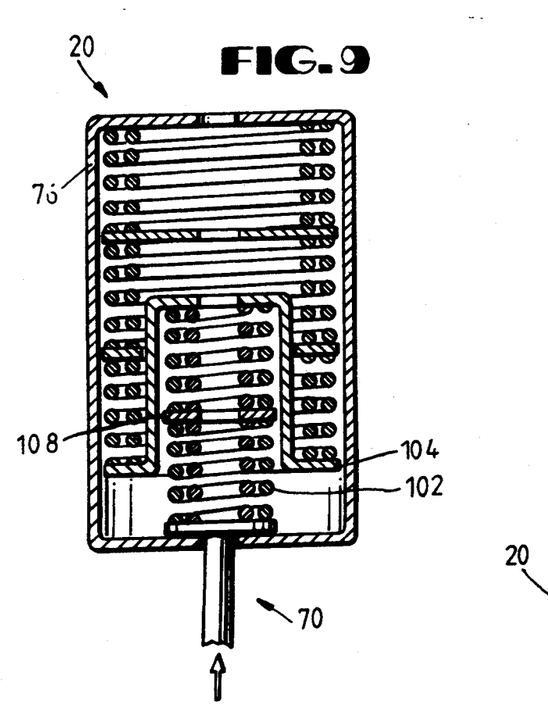
FIG. 9 illustrates a cross sectional side view of the riser tensioner system of FIG. 7 arranged to operate in the compression mode.

FIG. 9 shows the nested spring shock absorber 20 of FIG. 8 with the shock absorber 20 and nested metal springs 100 placed in compression similar to the elastomeric pad shock absorber of FIG. 3. The shock absorber 20 of FIG. 9 has the same components as FIG. 8, with the nested compression spring plunger 70 inverted in the nested compression spring housing 76.

Figure 10:
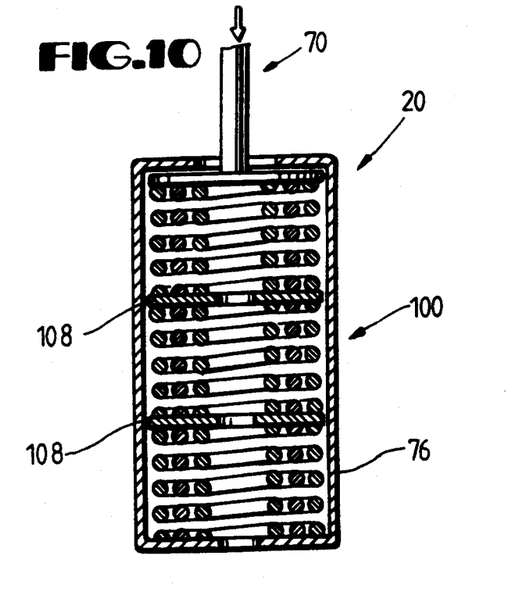
FIG. 10 illustrates a cross sectional side view of compression mode riser tensioner system using a series of longitudinally stacked compression springs.

FIG. 10 shows a shock absorber using a series of longitudinally stacked compression springs 100 not in a nested configuration. The shock absorber 20 consists of the compression spring plunger 70 which telescopes into and out of the compression spring housing 76. The compression spring plunger 70 compresses the compression springs 100, which are separated by the intermediate stabilizer plates 108.

Figure 11:
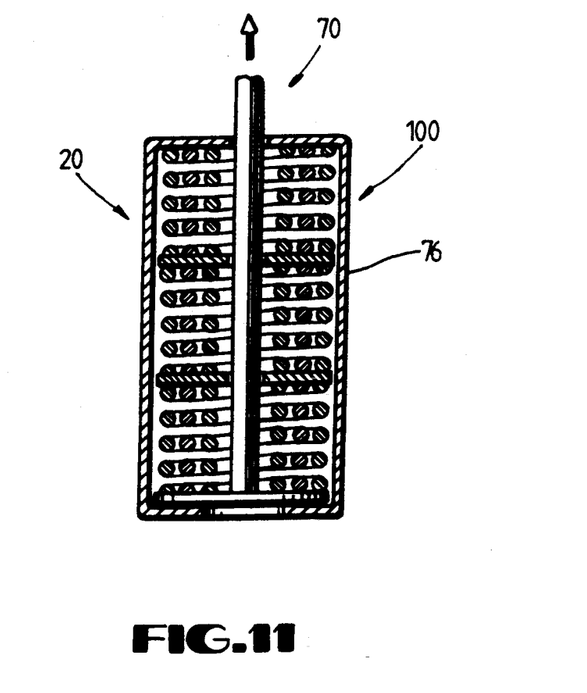
FIG. 11 illustrates a cross sectional side view of tension mode riser tensioner system using a series of longitudinally stacked compression springs.

FIG. 11 shows the shock absorber 20 of FIG. 10 rearranged to operate in a tension mode yet keeping the springs in compression. The shock absorber 20 of FIG. 11 contains the same components as FIG. 10 with the compression spring plunger 70 inverted in the compression spring housing 76.

Deflections of the springs 100 in compression allow the riser 12 to stroke while maintaining tension on the riser 12. The spring rate of the shock absorber 20 is determined by the number of springs in the stack and their arrangement. The response characteristics of the assembly may also be manipulated by varying the material and size of the springs 100.

Figure 12:
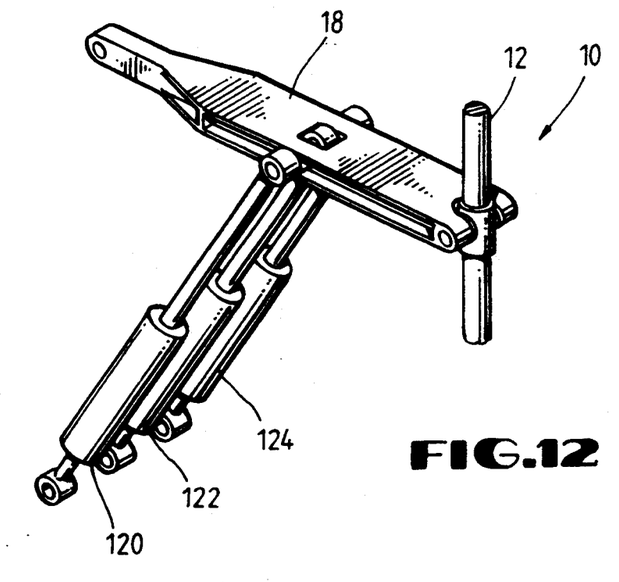
FIG. 12 illustrates a perspective view of another embodiment of a riser tensioner system that employs three parallel shock absorbers attached to the strut.
Figure 13:
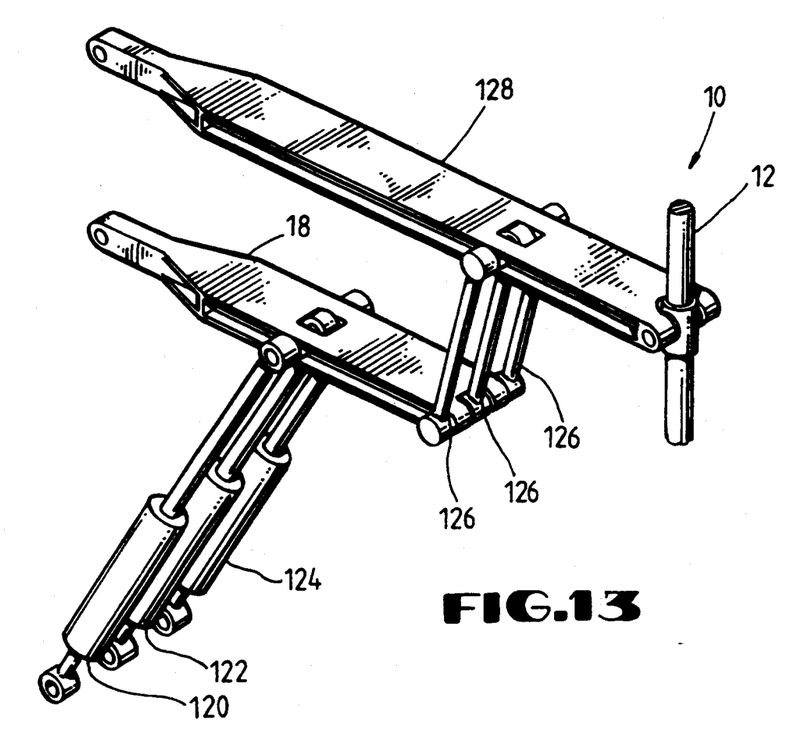
FIG. 13 illustrates a perspective view of another embodiment of a riser tensioner system that uses three parallel shock absorbers and a series of lever arms to enhance the force applied to the riser.

FIGS. 12 and 13 show that the response characteristics of a riser tensioner system 10 may also be manipulated via the use of mechanical lever systems and by adding multiple shock absorbers 20. By this means the response curve can be tailored as required. Such measures will allow enhancing the input-output response ratio and flattening of the load vs. deflection curve of the riser tensioner system 10. The ideal curve is a constant load over a large deflection range. This serves to minimize the oscillatory stresses in the riser system.

For example, FIG. 12 shows parallel shock absorbers 120, 122, 124 attached to the strut 18, replacing the single shock absorber 20 of FIG. 1.

Finally, FIG. 13 shows the parallel shock absorbers 120, 122, 124 attached to the strut 18 which is further attached by mechanical levers 126 to a strut 128. The strut 128, rather than the strut 18, is attached to the riser 12. The series of struts 18, 128 and levers 126 is employed to alter and enhance the response characteristics of the riser tensioner system 10.

Although the invention has been described above with particularity, this was merely to teach one of ordinary skill in the art how to make and use the invention. Many modifications will fall within the scope of the invention, as that scope is defined by the following claims.

We claim:

1. A riser tensioner system adapted for mounting between a floating platform and a riser, and for applying a generally upward force to the riser while allowing limited vertical movement therebetween, comprising:
   a housing having a central opening extending therein, said housing being adapted for coupling to said floating platform;
   a plunger assembly adapted for telescopic movement within said central opening of said housing, and plunger assembly comprising:
   a rod having first and second end portions, said rod first end portion being adapted for being coupled to said riser; and
   a plate coupled to said second end portion of said rod and positioned within said housing central opening; and
   at least one inner spring located within said housing and having a longitudinal axis substantially aligned with the longitudinal axis of said rod, said inner spring having a first stiffness;
   at least one outer spring located within said housing and having a longitudinal axis substantially aligned with the longitudinal axis of said rod, said outer spring having a diameter greater than the diameter of said inner spring, and being adapted for receiving said inner spring longitudinally disposed therein, said outer spring having a second stiffness substantially similar to said first stiffness whereby the inner and outer springs are compressed substantially in parallel in response to receiving a load thereon;
   a spring separator positioned between and contacting said inner and outer springs, said inner and outer springs being compressed by said plunger assembly urging one of said inner and outer springs against the spring separator, and said spring separator urging the other of said inner and outer springs against said housing; and
   a strut having first and second end portions and an intermediate portion, said intermediate portion being rotatably coupled to said plunger assembly, said strut first end portion being rotatably coupled to said offshore drilling platform, and said strut second end portion being rotatably coupled to said riser.

2. A riser tensioner system, as set forth in claim 1, wherein said inner and outer springs comprise:
   a plurality of longitudinally disposed helical compression springs having a longitudinal axis generally aligned with said rod; and
   intermediate stabilizer plates located within said housing central opening in longitudinally spaced apart relationship, positioned between said helical compression springs.

3. A riser tensioner system, as set forth in claim 1, wherein said inner and outer springs each comprise:
   at least one helical metal compression spring having a longitudinal axis generally aligned with the longitudinal axis of said plunger assembly.

4. A riser tensioner system, as set forth in claim 3, wherein said inner and outer springs each comprise:
   at least two longitudinally displaced helical metal compression springs having longitudinal axes generally aligned with the longitudinal axis of said plunger assembly; and
   at least one intermediate stabilizer plate positioned between and separating said helical metal compression springs.

5. A riser tensioner system adapted for use in an offshore drilling platform to support a riser while allowing limited vertical movement therebetween, comprising:
   a strut having a first and second end portion and an intermediate portion, said first end portion being adapted for being coupled to said offshore drilling platform, and said second end portion being adapted for being connected to said riser;
   a first shock absorber having a rod and plate assembly telescoping into and out of a housing adapted for being coupled to said offshore drilling platform, said rod being coupled at a first end portion to said plate and at a second end portion to the intermediate portion of said strut; and a spring positioned in said housing between said housing and said plate, whereby movement of said riser and strut in a first direction is resisted by said spring being compressed between said plate and housing.

6. A riser tensioner system, as set forth in claim 5, comprising:

a second shock absorber coupled in parallel with said first shock absorber between said offshore drilling platform and the intermediate portion of said strut.

7. A riser tensioner system, as set forth in claim 5, wherein said spring comprises a plurality of elastomeric pads arranged in side by side relationship and having a central opening positioned about said rod, said elastomeric pads being compressed together and against said housing in response to movement of said plunger assembly in said first direction.

8. A riser tensioner system, as set forth in claim 7, wherein said elastomeric pads have a generally conical configuration with said central opening being generally aligned with the longitudinal axis of said elastomeric pads.

9. A riser tensioner system, as set forth in claim 5, wherein said spring comprises:

a plurality of helical compression springs having a longitudinal axis generally aligned with said rod; and intermediate stabilizer plates located within said housing central opening in longitudinally spaced apart relationship, positioned between said helical compression springs.

10. A riser tensioner system, as set forth in claim 5, including a strut having first and second end portions and an intermediate portion, said intermediate portion being rotatably coupled to said plunger assembly, said strut first end portion being rotatably coupled to said offshore drilling platform, and said strut second end portion being rotatably coupled to said riser.

11. A riser tensioner system, as set forth in claim 5, wherein said spring includes:

at least one inner spring located within said housing and having a longitudinal axis substantially aligned with the longitudinal axis of said rod;

at least one outer spring located within said housing and having a longitudinal axis substantially aligned with the longitudinal axis of said rod, said outer spring having a diameter greater than the diameter of said inner spring; and a spring separator positioned between and contacting said inner and outer springs, said inner spring being compressed by said plunger assembly urging said inner spring against the spring separator, and said outer spring being compressed by said spring separator urging said outer spring against said housing.

12. A riser tensioner system, as set forth in claim 11, wherein said inner spring and said outer spring comprise a plurality of elastomeric pads positioned in side by side relationship and longitudinally disposed relative to one another within said housing.

13. A riser tensioner system, as set forth in claim 12, wherein said elastomeric pads are conically shaped.

14. A riser tensioner system, as set forth in claim 11, wherein said inner and outer springs each comprise:

at least one helical metal compression spring having a longitudinal axis generally aligned with the longitudinal axis of said plunger assembly.

15. A riser tensioner system, as set forth in claim 14, wherein said inner and outer springs each comprise:

at least two longitudinally displaced helical metal compression springs having longitudinal axes generally aligned with the longitudinal axis of said plunger assembly; and at least one intermediate stabilizer plate positioned between and separating said helical metal compression springs.

16. A riser tensioner system, as set forth in claim 5, wherein said spring comprises a plurality of elastomeric pads arranged in side by side relationship along an axis substantially longitudinally aligned with said rod, said elastomeric pads being compressed together and against said housing in response to movement of said plunger assembly in said first direction.

17. A riser tensioner system, as set forth in claim 16, wherein said elastomeric pads are toroidal and have a generally conical cross sectional configuration.

18. A method for using a shock absorber and strut to support a riser on an offshore drilling platform while allowing limited vertical movement therebetween, comprising the steps of:

coupling a strut between said riser and said offshore drilling platform; coupling said shock absorber between said strut and said drilling platform; and positioning a spring mechanism within said shock absorber so that movement of said riser and strut in a first direction is resisted by compression of said spring.

* * * * *